US010103887B2

(12) United States Patent
Fransen

(10) Patent No.: US 10,103,887 B2
(45) Date of Patent: Oct. 16, 2018

(54) OPERATOR-ASSISTED KEY ESTABLISHMENT

(75) Inventor: Frank Fransen, Zuidhorn (NL)

(73) Assignees: Koninklijke KPN N.V., The Hague (NL); Nederlandse Organisatie Voor Toegepast-Natuurwetenschappelijk Onderzoek TNON, The Hague (NL)

(*) Notice: Subject to any disclaimer, the term of this patent is extended or adjusted under 35 U.S.C. 154(b) by 0 days.

(21) Appl. No.: 13/996,168

(22) PCT Filed: Dec. 6, 2011

(86) PCT No.: PCT/EP2011/071859
§ 371 (c)(1),
(2), (4) Date: Jun. 20, 2013

(87) PCT Pub. No.: WO2012/084484
PCT Pub. Date: Jun. 28, 2012

(65) Prior Publication Data
US 2013/0297937 A1 Nov. 7, 2013

(30) Foreign Application Priority Data

Dec. 21, 2010 (EP) .................. 10196158

(51) Int. Cl.
H04L 29/06 (2006.01)
H04L 9/32 (2006.01)
(Continued)

(52) U.S. Cl.
CPC ............ *H04L 9/32* (2013.01); *H04L 9/0816* (2013.01); *H04L 9/0838* (2013.01);
(Continued)

(58) Field of Classification Search
CPC . H04L 63/0435; H04L 63/061; H04L 63/062; H04L 9/0816; H04L 9/32;
(Continued)

(56) References Cited

U.S. PATENT DOCUMENTS

2005/0125662 A1* 6/2005 Fischer ............... H04W 12/06
713/168
2007/0086591 A1* 4/2007 Blom ................. H04L 63/0435
380/279
(Continued)

FOREIGN PATENT DOCUMENTS

CN 101299884 A 11/2008
EP 1973265 A1 9/2008
(Continued)

OTHER PUBLICATIONS

PCT International Search Report and Written Opinion, PCT International Application No. PCT/EP2011/071859 dated Feb. 13, 2012.
(Continued)

Primary Examiner — Joseph P Hirl
Assistant Examiner — Chi D Nguy
(74) Attorney, Agent, or Firm — McDonnell Boehnen Hulbert & Berghoff LLP

(57) ABSTRACT

The invention relates to a method and system for key distribution and encryption/decryption. An encryption key ($K_{enc}$) is derived in a terminal. The encryption key is applied by the terminal for encrypting at least a part of data included in an application message for an application server transmitted over a network. The terminal and the network both have access to a first key ($K_1$). The terminal and the server both have access to a second key ($K_2$). The encryption key is derived at the terminal using the first key and the second key. The first key or the derivative thereof is received at the server. The encryption key for decrypting the application message encrypted by the terminal is derived in the server using the shared second key and the received first key of the derivative thereof.

20 Claims, 7 Drawing Sheets

(51) Int. Cl.
*H04L 9/08* (2006.01)
*H04W 12/04* (2009.01)
*H04W 4/70* (2018.01)

(52) U.S. Cl.
CPC .......... *H04L 9/0866* (2013.01); *H04L 9/3228* (2013.01); *H04L 63/06* (2013.01); *H04W 12/04* (2013.01); *H04L 2209/80* (2013.01); *H04L 2463/061* (2013.01); *H04W 4/70* (2018.02)

(58) Field of Classification Search
CPC ... H04L 9/0838; H04L 9/0861; H04L 9/0866; H04L 9/3228; H04L 63/06; H04L 2209/80; H04L 2463/061; H04W 12/04; H04W 4/005
USPC .......... 713/152–155; 380/44, 259, 262, 270, 380/284
See application file for complete search history.

(56) References Cited

U.S. PATENT DOCUMENTS

| | | | | |
|---|---|---|---|---|
| 2008/0273704 | A1* | 11/2008 | Norrman et al. | 380/278 |
| 2009/0196424 | A1* | 8/2009 | Germaneau et al. | 380/277 |
| 2010/0008507 | A1* | 1/2010 | Galante | H04L 63/068 380/278 |
| 2011/0029777 | A1* | 2/2011 | Murakami | G06F 9/4401 713/171 |
| 2011/0131414 | A1* | 6/2011 | Cheng | H04L 63/06 713/170 |
| 2011/0211700 | A1* | 9/2011 | Park | H04L 63/061 380/282 |
| 2012/0057697 | A1* | 3/2012 | Holtmanns et al. | 380/42 |

FOREIGN PATENT DOCUMENTS

| | | |
|---|---|---|
| EP | 2290875 A1 | 3/2011 |
| WO | WO2008/038949 A1 | 4/2008 |

OTHER PUBLICATIONS

"3rd Generation Partnership Project; Technical Specification Group Services and System Aspects; Service Requirements for Machine-Type Communications (MTC); Stage 1 (Release 10)", 3GPP TS 22.368, V10.2.0, Sep. 2010, pp. 1-22.

"3rd Generation Partnership Project; Technical Specification Group Core Network and Terminals; Characteristics of the Universal Subscriber Identity Module (USIM) Application (Release 8)", 3GPP TS 31.102, V8.10.0, Oct. 2010, pp. 1-210.

"3rd Generation Partnership Project; Technical Specification Group Services and System Aspects; 3G Security; Security Architecture (Release 9)", 3GPP TS 33.102, V9.3.0, Oct. 2010, pp. 1-72.

"3rd Generation Partnership Project; Technical Specification Group Services and System Aspects; Generic Authentication Architecture (GAA); Generic Bootstrapping Architecture (Release 9)", 3GPP TS 33.220, V9.3.0, Jun. 2010, pp. 1-75.

"3rd Generation Partnership Project; Technical Specification Group Services and System Aspects; 3GPP System Architecture Evolution (SAE); Security Architecture (Release 8)", 3GPP TS 33.401, V8.7.0, Apr. 2010, pp. 1-99.

"Introducing the Generic Term "eKSI" for the Key Set Identifier in E-UTRAN", 3GPP TSG-SA WG3 Meeting #53, S3-081518, Kyoto, Japan, Nov. 10-14, 2008, 20 pages.

Tatebayashi, Makoto et al., "Key Distribution Protocol for Digital Mobile Communication Systems", Lecture Notes in Computer Science, Advances in Cryptology, CRYPTO '89 Proceedings, vol. 435, 1990, pp. 324-334.

European Search Report, European Patent Application No. 10196158.9 dated May 4, 2011.

* cited by examiner

US 10,103,887 B2
OPERATOR-ASSISTED KEY ESTABLISHMENT

CROSS REFERENCE TO RELATED APPLICATIONS

The present application is a national stage entry of PCT/EP2011/071859, filed Dec. 6, 2011, and claims priority to EP 10196158.9 filed Dec. 21, 2010. The full disclosures of EP 10196158.9 and PCT/EP2011/071859 are incorporated herein by reference.

FIELD OF THE INVENTION

Generally, the invention relates to the field of secure data transfer. More specifically, the invention relates to the field of secure transfer of data from a terminal to an application server, for example for machine-to-machine (M2M) communication.

BACKGROUND OF THE INVENTION

In existing data transfer environments, terminals sometime need to transmit data to servers over the network. Typically, the terminals and particular nodes (e.g. HLR/AuC and HSS/AuC) of a network cooperate in order to authenticate the terminals in the network and to encrypt data over the radio part of the network. A detailed description is provided in 3GPP TS 31.102, 3GPP TS 33.102 and 3GPP TS 33.401.

After authentication, an encryption key is shared between the terminals and the network node and can be used to encrypt data transmitted from the terminal to the network node. With this encryption key, the terminal may encrypt data transmitted to the network node and the network node may decrypt the received data for transmitting the decrypted data further, to the server.

Such an environment has several drawbacks. First of all, it may be highly undesirable to transmit unencrypted information from the network node to the server. Second, with this approach, the network node has access to unencrypted data destined for the server, but there are situations where security mechanisms are desired that would not allow the network node to have access to the data being transmitted from the terminal to the server.

Present solution to these problems includes establishing an end-to-end secure tunnel (e.g. IPSec) between the terminal and the server. Such secure tunnel, however, provides significant overhead in establishing cryptographic keys and maintaining the tunnel. The mobile network operator may assist the establishing of session keys between the terminal and the server by implementing Generic Bootstrapping Architecture (GBA). GBA, however, also provides significant overhead to the communication. A description of GBA is provided in 3GPP TS 33.220.

A cellular access network generally has a relatively low bandwidth and long latency as compared to fixed networks. Especially for terminals that are silent for long periods of time and then send a short burst of data over a cellular access network, the overhead for establishing cryptographic session keys is significant. Such terminals are typically applied in the field of machine-to-machine (M2M) communication as currently being standardized in 3GPP (see e.g. TS 22.368). In such cases, either the secure tunnel uses the same key for a longer period of time resulting in a less secure solution or the secure tunnel uses a new key, the session key, every time the terminal wants to send data resulting in a long delay before the data can be sent.

SUMMARY OF THE INVENTION

It is an object of the invention to provide a method and system for secure data transfer over at least a significant part of the data transfer path between a terminal and a server over a network in a manner that improves on or eliminates at least some of the problems described above.

To that end, a method for at least deriving a cryptographic key in a terminal is disclosed. The cryptographic key can be used by the terminal as an encryption key $K_{enc}$ and as an integrity protection key $K_{int}$. The encryption key $K_{enc}$ is applicable by the terminal for encrypting at least a part of data included in an application message from the terminal to an application server transmitted over a network. The integrity key $K_{int}$ is applicable by the terminal for authenticating and protecting the integrity at least a part of data included in the application message. The terminal and the network both have access to a first key, while the terminal and the server both have access to a second key. The method includes deriving the cryptographic key using the first key and the second key.

In an embodiment, the first key may be generated at the network and the method may also include the step of receiving the first key at the terminal. In addition, when the encryption key $K_{enc}$ is derived, the method may further include the steps of encrypting part of data using the derived encryption key $K_{enc}$ and transmitting the application message comprising the encrypted part of data to the server over the network.

A terminal for use in the above method is also disclosed. The terminal includes a processor configured for deriving the cryptographic key using the first key and the second key.

In addition, a method for deriving a cryptographic session key in an application server is disclosed. The cryptographic key comprises at least one of an encryption key $K_{enc}$ and an integrity key $K_{int}$. The encryption key $K_{enc}$ is applicable by the server for decrypting at least a part of data included in an application message for the application server transmitted from a terminal over a network. The integrity key $K_{int}$ is applicable by the server for authenticating and protecting the integrity of at least a part of data included in the application message. The terminal and the network both have access to a first key, while the terminal and the server both have access to a second key. The method includes obtaining, at the server, the first key or a derivative thereof and deriving the cryptographic key using the obtained first key or the derivative thereof and the second key.

In one embodiment, the derivative of the first key includes a partial key $K_{part}$ generated at the terminal using the first key and a parameter associated with a communication session between the terminal and the network, such as e.g. encryption algorithm identification (Alg-ID(ENC)) or integrity algorithm identification (Alg-ID(INT)). In such an embodiment, the terminal derives the cryptographic key using the partial key $K_{part}$ and the second key.

For the embodiments where the cryptographic key comprises an encryption key $K_{enc}$, the method may also include the step of decrypting the encrypted part of data using the derived encryption key $K_{enc}$.

Further, an application server for use in the above method is disclosed. The server includes means for obtaining the first key or a derivative thereof, and a processor for deriving at least one the encryption key $K_{enc}$ and the integrity key $K_{int}$ using the obtained first key or the derivative thereof and the second key.

Still further, a network configured for use in the above methods, with the above terminal, or the above application server is disclosed. The network node is configured for at least receiving the application message from the terminal and transmitting the application message to the server.

Also, the present disclosure relates to a computer program with portions (possibly distributed) for performing the various functions described herein, to a data carrier for such software portions and to a telecommunications system.

Each of the first key and the second key of the terminal may either be stored in a (U)SIM card of the terminal or another storage of the terminal. Especially for M2M applications, terminals have been envisaged that may not possess a (U)SIM card.

For terminals that do include a (U)SIM card, at least some of the calculations performed by the processor in the terminal, described herein, may be performed by a processor included in the (U)SIM card of the terminal.

In the following, discussions are provided with respect to establishing a cryptographic session key for encryption, the encryption key $K_{enc}$. However, persons skilled in the art will recognize that at least some of the discussions are also applicable for the integrity key $K_{int}$.

Data (D) encrypted under the encryption key $K_{enc}$ may comprise at least one of user data (U) for the application server, authentication data (SRES) for the authentication at the application server, and a password previously shared between the terminal and the application server.

The application message could be encapsulated in a signalling message sent from the terminal to the network as described in the application WO 2010/049437 entitled "Telecommunications network and method of transferring user data in signalling messages from a communication unit to a data processing centre," the entire disclosure of which is incorporated herein by reference.

When an encryption key is derived based on both a key shared between the terminal and the network and a key shared between the terminal and the server, the network does not have access to the encryption key because it does not have access to the key shared between the terminal and the server. As a result, the network may not have access to the data transmitted from the terminal to the server encrypted under such a key. At the same time, using the key shared between the terminal and the network when deriving the encryption key provides higher level of security for the resulting encryption key because, typically, the key shared between the terminal and the network changes often, sometimes even with each new communication session between the terminal and the network. In this manner, network operator may assist in establishing cryptographic keys for encrypting and/or authenticating data transmitted from a terminal to a server over a network while not having access to the cryptographic keys or the data being transmitted.

The disclosed solution is, although not being limited to this field, especially advantageous for M2M communications. M2M communications typically involves hundreds, thousands or millions of terminals. Some applications only rarely require access to a network. An example involves collecting information by a server from e.g. smart electricity meters at the homes of a large customer base. Other examples include sensors, meters, coffee machines etc. that can be equipped with communication modules that allow for reporting status information to a data processing centre over the telecommunications network. Also, mobile navigation terminals and payment terminals are examples of M2M applications. At least some of these examples are characterized by short bursts of data that only occur rarely while at least some of the data is privacy sensitive or confidential and requires secure transfer, preferably up to the point of the server destination of the data. The presented solution provides for efficient yet secure transfer of data for such applications.

In various embodiments, the second key may include a static key shared between the terminal and the server ($K_{M2M}$), while the first key may include a cryptographic key or unique parameter associated with a communication session between the terminal and the network such as e.g. a session key (e.g. CK and IK, or $K_{ASME}$), one or more parameters based on which the session key may be generated (SQN, AK), or a random number (RAND).

While the second key is preferably a secret key, in various embodiments the first key may or may not be secret.

In one embodiment, the step of deriving the encryption key $K_{enc}$ at the terminal using the first key and the second key may include, first, deriving a partial key $K_{part}$ using the first key and a parameter associated with a communication session between the terminal and the network and then deriving the encryption key $K_{enc}$ using the partial key $K_{part}$ and the second key. Deriving an intermediate partial key adds an additional level of security to the resulting encryption key $K_{enc}$. In such an embodiment, the network may, optionally, be configured to derive the partial key $K_{part}$ and forward the partial key to the server. In various embodiments described herein, the network may forward a key to the server by e.g. appending the key to the application message, by sending the key along with the application message, or by providing the key to the server separately from the application message, e.g. upon receipt of a request from the server to do so.

Alternatively, the terminal may be configured to provide the partial key to the server itself by including the partial key in the application message. This embodiment is advantageous in that, besides assisting in establishing the encryption key in the first place, no further network involvement such as deriving and providing the partial key to the server is necessary and the network only needs to pass the application message through from the terminal to the server. The terminal could provide the partial key to the server by e.g. concatenating the partial key with the encrypted data in the application message. The partial key could be included by the terminal in the application message either unencrypted or encrypted under the second key or a derivative thereof, as long as the encryption key for encrypting the partial key is also known to the server.

In another embodiment, the encryption key $K_{enc}$ may be derived by using the first key and the second key directly (i.e., without deriving the partial key), thus reducing the amount of computations necessary for deriving the encryption key. Similar to the embodiments including the use of the partial key described above, in the embodiment where the encryption key $K_{enc}$ is derived directly from the first key and the second key, the first key could be provided to the server either by the network or by the terminal. If the first key is to be provided to the server by the network, then the network could be configured for forwarding the first key to the server in one of the manners described herein for the partial key. If the first key is to be provided to the server by the terminal itself, the terminal could be configured for including the first key in the application message in a manner described above for including the partial key.

Depending on how the first key or the derivative thereof is provided to the server, the method for at least deriving the encryption key $K_{enc}$ in the application server may further include either receiving the first key or the derivative thereof from the network (in the embodiments where the network is configured for providing the first key or the derivative thereof to the server, as described above) or receiving the application message including the first key or the derivative thereof and extracting the first key or the derivative thereof from the received application message (in the embodiments where the terminal is configured for providing the first key or the derivative thereof to the server, as described above).

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
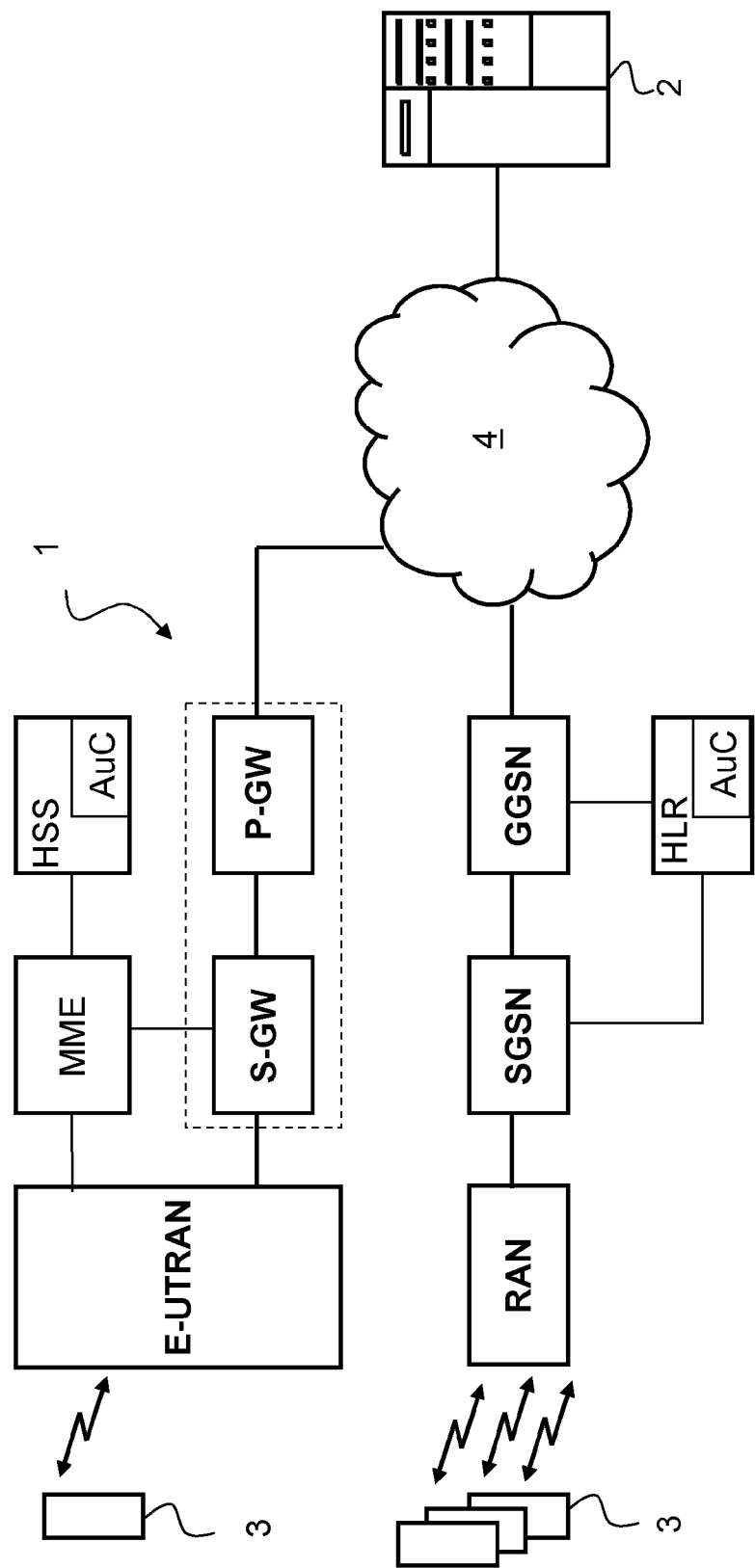
FIG. 1 is a schematic illustration of a 4G telecommunications network connecting terminals to an application server.

FIG. 1 shows a schematic illustration of a telecommunications network 1. The telecommunications network 1 allows data sessions between a server 2 and a terminal 3 over a data network 4, wherein access of the terminal to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a Gateway GPRS Support Node (GGSN), a Serving GPRS Support Node (SGSN) and a Radio Access Network (RAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeBs), also not shown. The GGSN and the SGSN are conventionally connected to a Home Location Register (HLR) that contains subscription information of the terminals 3. In the figure, the HLR is combined with an authentication centre (AuC) for authenticating terminals 3 in the network.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs) providing wireless access for a terminal 3 that is connected to the S-GW via a packet network. The S-GW is connected to a Home Subscriber Server HSS and a Mobility Management Entity MME for signalling purposes. The HSS includes a subscription profile repository and an authentication centre (AuC).

Further information of the general architecture of a EPS network can be found in 3GPP TS 23.401.

Whereas the invention as defined in the appended claims is generally applicable to all of the above-described networks, a more detailed description of embodiments of the invention will be provided below for an LTE network. Persons skilled in the art will readily recognize adaptations necessary to implement the ideas discussed herein in other networks and architectures.

For an LTE network, the MME is the network node typically controlling the connection between the telecommunications network 1 and the terminal 3. It should be appreciated that the telecommunications network 1 generally comprises a plurality of MMEs, wherein each of the MMEs is connected typically to several BSCs/RNCs to provide a packet service for terminals 3 via several eNodeBs.

In an M2M environment, a single server 2 normally is used for communication with a large number of terminals 3. Individual terminals 3 can be identified by individual identifiers, such as an IP address, an International Mobile Subscriber Identity (IMSI) or another terminal identifier.

Before the terminal 3 can access services provided by the network or transmit application messages to the server via a network node such as the MME node for the LTE network, the terminal 3 needs to be authenticated to the network. A manner for providing such authentication is known, but is briefly summarized in FIG. 2 where the terminal 3 is represented as comprising an M2M device and USIM.

Figure 2:
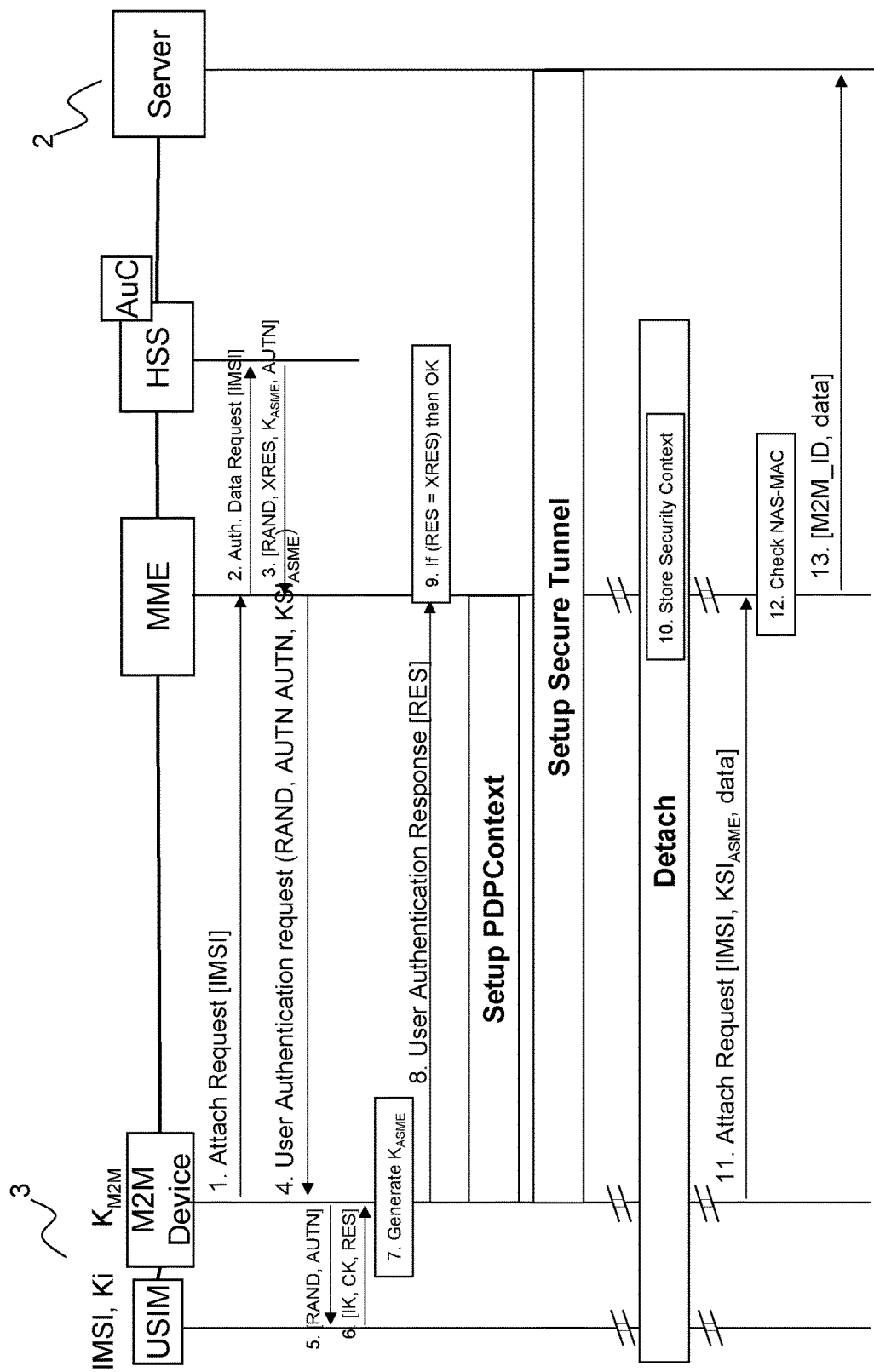
FIG. 2 is a schematic illustration of authenticating a terminal to a network according to prior art.

As shown in FIG. 2, in step 1, the terminal 3 initiates the attach procedure to inform the telecommunications network that it wants to access network's services by transmitting an Attach Request containing terminal's IMSI to the MME. In step 2, the MME transmits a request to the HSS. Upon receipt of the Attach Request, the HSS generates a random number RAND, a network authentication token AUTN, a session key $K_{ASME}$, and a Response XRES. The network authentication token AUTN has the purpose of allowing the terminal to authenticate the network thereby preventing so-called a "false base station" attack, wherein malicious base station which in reality does not belong to the network. The AUTN includes the result of performing an XOR operation on a sequence number SQN and a secret Anonymity Key AK, SQN⊕AK. An Authentication Management Field AMF and a Message Authentication Code MAC are used for authenticating the message to the terminal 3. In step 3, the HSS transmits the RAND, the $K_{ASME}$, the XRES, and the AUTN to the MME. The MME stores these parameters. In step 4, the MME transmits the RAND, the AUTN, and the $KSI_{ASME}$ to the terminal 3, which, in step 5, passes the RAND and the AUTN to it's USIM and, in response, in step 6, obtains a response RES derived by the USIM. In step 7, the terminal 3 generates the session key $K_{ASME}$ based on the Integrity Key IK, Cipher Key CK, Serving Network identity SN id, Sequence Number SQN, and Anonymity Key AK. Integrity Key IK and Cipher Key CK are the cryptographic keys generated during AKA by the USIM, and are used in UMTS to protect the communication of UTRAN. In LTE, CK and IK are used as the basis for $K_{ASME}$. In step 8, the terminal 3 transmits the RES to the MME. In the last step of the authentication procedure, step 9, the MME checks whether the terminal-generated RES matches the network-generated XRES stored in the MME. When the terminal-generated RES matches the network-generated XRES, the terminal 3 is authenticated to the network and the session key $K_{ASME}$ shared between the terminal 3 and the MME can be used to encrypt data transmitted from the terminal 3 to the MME. A more detailed description of the authentication procedure is provided in 3GPP TS 33.102 and 3GPP TS 33.401.

Once the terminal 3 has been authenticated with the network, in step 10, the MME stores the security context for the communication session and the terminal 3 may transmit data to the network, including transmitting application messages to the server over the network. The security context may also be stored in the terminal 3.

Now the terminal 3 may setup a PDP Context to communicate to the server 2. In order to secure the communication the terminal 3 and server 2 may setup a secure tunnel. Such secure tunnel, however, provides significant overhead in establishing cryptographic keys and maintaining secure tunnel, as described above. As also described above, the mobile network operator may assist the establishing of session keys between the terminal 3 and the server 2 by implementing GBA, but this also introduces significant overhead.

FIG. 2 illustrates that after a while, the terminal 3 is detached from the network (i.e., the terminal 3 is offline). However, in step 11, the terminal 3 may transmit small amount of data encapsulated in a signalling message by using the method described in WO2010/049437. In step 12, the MME obtains the security context using $KSI_{ASME}$ and checks NAS-MAC of the signalling message to make sure the message comes from the authenticated terminal, and, in step 13, transmit the data to the server 2, along with the identification of the particular terminal sending the data (M2M_ID). Such data is either sent completely unencrypted or is sent encrypted using a key derived from the session key $K_{ASME}$ from the terminal 3 to the MME, where the MME decrypts data and forwards it to the server 2 unencrypted. As described previously, these approaches are inappropriate when a particular application demands that the data is encrypted for the entire path between the terminal and the server and when a particular application demands that the MME may not have access to the data.

The present invention is based on the insight that the session key $K_{ASME}$, the random number RAND, or other unique parameters established between the terminal 3 and the MME in a particular communication session between the terminal 3 and the MME and stored in step 10 of FIG. 2 or newly generated for a new attachment of the terminal to the network may be reused to derive an encryption key for encrypting data transmitted from the terminal 3 to the server 2.

Figures 3A, 3B:
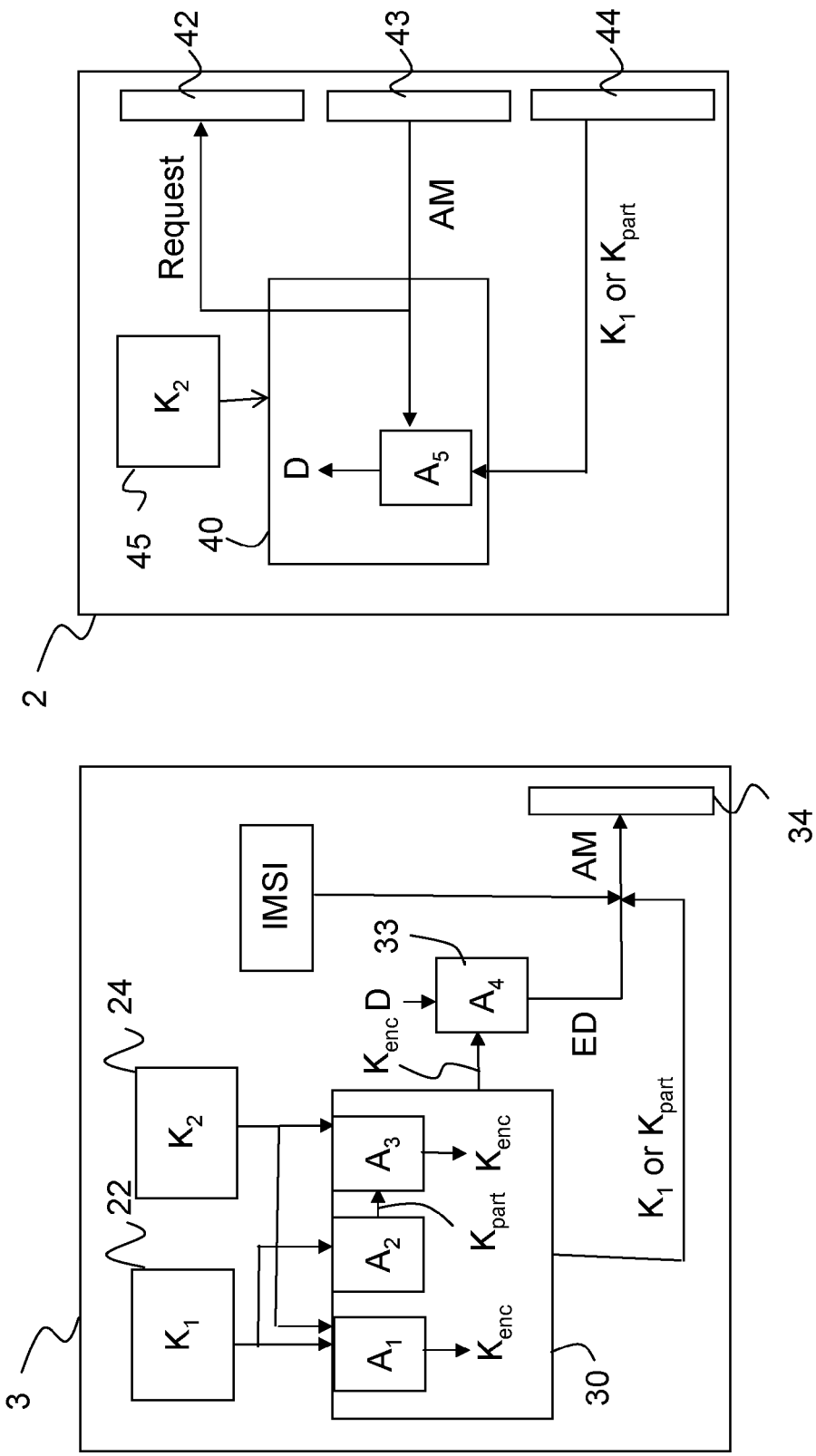
FIGS. 3A-3C are schematic illustrations of a terminal, an application server, and a network node, respectively, according to an embodiment of the invention.
Figure 3C:
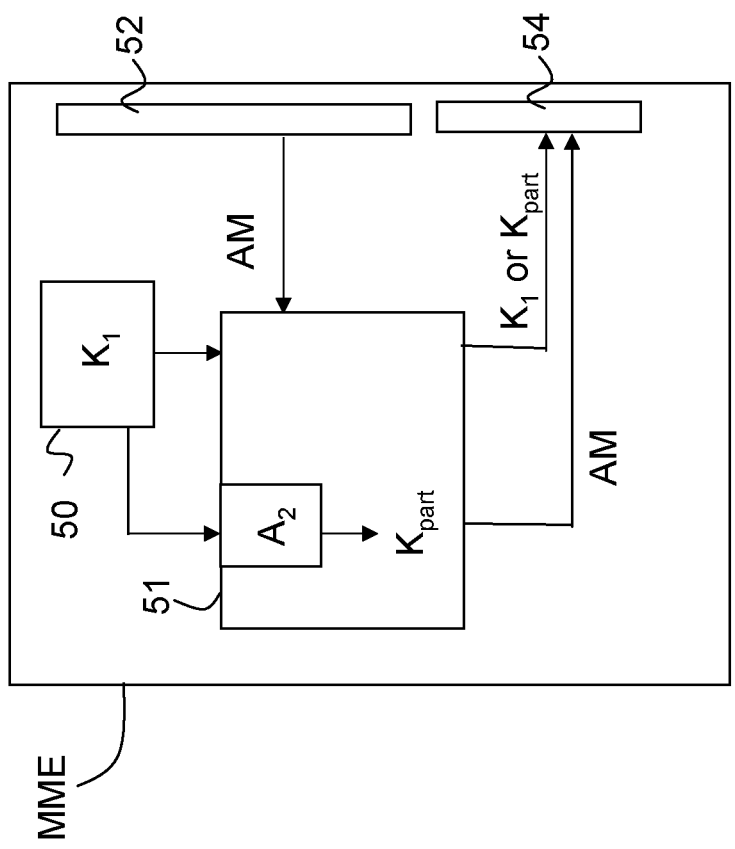

FIGS. 3A, 3B, and 3C are schematic illustrations of a terminal 3, a network node of the network 1, and a server 2, respectively, according to embodiments of the invention. The functionality of these devices is described in greater detail in association with FIGS. 4-7.

As shown in FIG. 3A, the terminal 3 includes at least a storage 22 for storing a first key $K_1$ and a storage 24 for storing a second key $K_2$, where the first key is the secret key shared between the terminal 3 and the MME, and the second key is the secret key shared between the terminal 3 and the server 2. In an alternative embodiment, the first and second keys could be stored in a single storage 22. The storage 22 and/or the storage 24 could be implemented as a secure module such as (U)SIM either within the terminal 3 or outside of the terminal 3 (i.e., be an external storage).

In various embodiments, the first key $K_1$ may include one or more of the session key $K_{ASME}$, the random number RAND, or other unique parameters established between the terminal 3 and the MME in a particular communication session between the terminal 3 and the MME, such as e.g. SQN, AK, SQN⊕AK. The first key $K_1$ could be either received by the terminal 3 from the MME or derived locally in the terminal 3, possibly based on another parameter received from the MME. The second key $K_2$ may be e.g. a static secret key shared between the terminal and the server, such as $K_{M2M}$.

As further shown in FIG. 3A, the terminal 3 also includes a processor 30 for deriving an encryption key $K_{enc}$ based on the first and second keys. As illustrated in FIG. 3A and described in greater detail below, there are two alternative techniques that could be implemented in the processor 30 for deriving the encryption key. One technique includes the processor 30 deriving the encryption key directly by applying a generation algorithm $A_1$ to the first and second keys. Another technique includes the processor 30 first deriving a partial key $K_{part}$ by applying a generation algorithm $A_2$ to the first key $K_1$ and a parameter associated with a communication session between the terminal 3 and the MME, and then deriving the encryption key $K_{enc}$ by applying a generation algorithm $A_3$ to the partial key $K_{part}$ and the second key $K_2$.

At least part of the functionality of the processor 30 may be included within a USIM within the terminal 3.

In alternative embodiments, one or more of these derivations could be carried out by a processor outside of the terminal 3. For example, in an embodiment where the USIM is used to store one or both of the keys $K_1$ and $K_2$ externally to the terminal 3, the USIM could also derive and, possibly, store the partial key $K_{part}$ and/or the encryption key $K_{enc}$.

The terminal 3 further includes an encrypter 33 configured for encrypting at least part of data D to be included in the application message (e.g. the part containing the user data U destined for the server 2) using an encryption algorithm $A_4$ and the derived encryption key $K_{enc}$, thus generating encrypted data ED. The encrypter 33 could, optionally, be included within the processor 30.

The application message AM is formed by including at least the encrypted data ED. In some embodiments, the application message may further include either the first key $K_1$ or the partial key $K_{part}$. Furthermore, preferably, the application message also includes an identifier of the terminal 3, such as the IMSI, which could be transmitted in a manner known per se. The terminal 2 may then transmit the application message to the network node, such as the MME, using a transmitter 34.

FIG. 3B is a schematic illustration of an application server 2. As shown, the server 2 includes at least a processor 40, a storage 45 for storing the second key $K_2$, and a receiving interface 43, where the receiving interface 43 is configured for receiving the application message AM forwarded by the MME and the processor 40 is configured to derive the encryption key $K_{enc}$ for decrypting the encrypted part of the application message.

In order to derive the encryption key $K_{enc}$, the processor 40 needs to have access to either the first key or the partial key, depending on how the encryption key was derived in the terminal 3. In one embodiment, the first key or the partial key, unencrypted, could be included in the application message generated at the terminal 3 and the processor 40 is configured to extract the first key or the partial key from the application message. In another embodiment, the first key or the partial key could be first encrypted using the second key $K_2$ as an encryption key and then included in the application message generated at the terminal 3. The server 2 may then extract the first key or the partial key and decrypt it using the second key stored at the server 2. In another embodiment, the server 2 could receive the first key or the partial key, unencrypted, from the network node via a receiving interface 44 or along with the application message via the receiving interface 43. In yet another embodiment, the server 2 could further include a requesting interface 42 for requesting the first key or the partial key from the network node. In such an embodiment, the processor 40 and the requesting interface 42 may be used for authenticating the application server 2 with the network node and, possibly, for transmitting the received IMSI of the terminal 3 from the server 2 to the network node enabling the network node to verify whether the request for the first key or the partial key is authorized. The server 2 would then further contain a receiving interface 44 for receiving the requested first key or partial key.

Processor 40 may apply algorithm $A_5$ for decrypting the encrypted part of the application message using the derived encryption key $K_{enc}$ to obtain the data D.

FIG. 3C is a schematic illustration of a network node, such as the MME in an LTE network, for at least receiving the application message, via a receiving interface 52, from the terminal 3 and transmitting the application message, via a transmitting interface 54, to the server 2. Like the terminal 3, the network node has access to the first key $K_1$ in storage 50. The first key may either be generated at the MME or received from a further network node (e.g. HSS).

In the embodiments where the terminal 3 does not include the first key or partial key in the application message, the network node may be further configured to transmit the first key or the partial key to the server 2. To that end, the network node may include a processor 51 for deriving the partial key by applying the generation algorithm $A_2$ to the first key and the parameter associated with a communication session between the terminal 3 and the MME.

Figure 4:
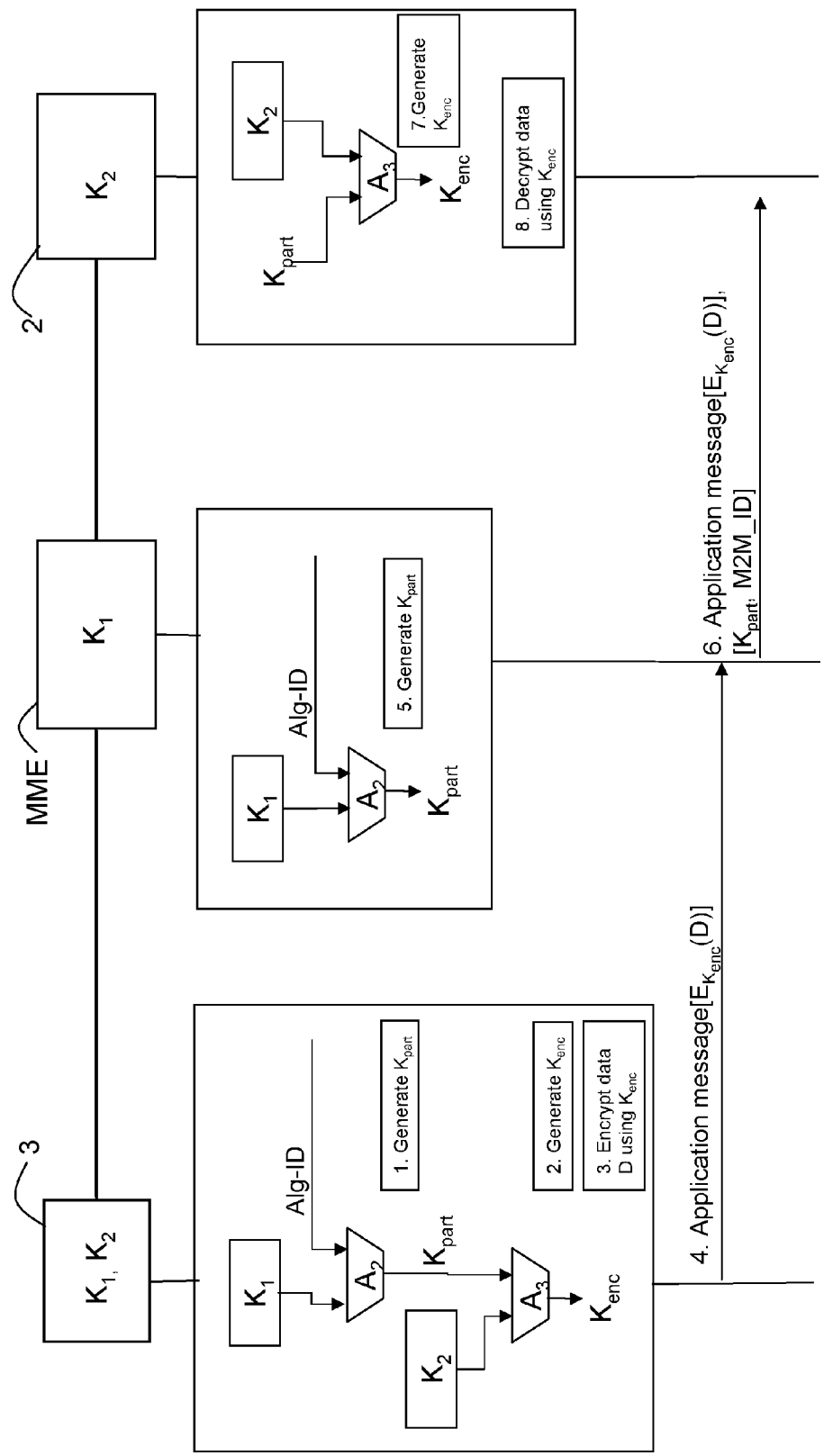
FIGS. 4-6 provide schematic illustrations of key distribution operations in accordance with various embodiments of the invention.

FIG. 4 provides a schematic illustration of key distribution operation according to one embodiment of the invention. Following authentication of the terminal 3 to the network as described e.g. in steps 1-9 of FIG. 2, in step 1, the processor 30 of the terminal 3 generates a partial key $K_{part}$ by applying a key generation algorithm $A_2$ to the first key and a parameter associated with a communication session between the terminal 3 and the MME, such as e.g. an encryption algorithm identification Alg-ID (ENC).

Some exemplary ways for deriving the partial key $K_{part}$ include the following:

$$K_{part} = A_2(K_{ASME}, \text{Alg-ID(ENC)}) \quad (1)$$

$$K_{part} = A_2(\text{RAND}, \text{Alg-ID(ENC)}) \quad (2)$$

$$K_{part} = A_2(\text{SQN} \oplus \text{AK}, \text{Alg-ID(ENC)}) \quad (3)$$

$$K_{part} = A_2(\text{RAND}, \text{SQN} \oplus \text{AK}, \text{Alg-ID(ENC)}) \quad (4)$$

$$K_{part} = A_2(\text{SQN}, \text{Alg-ID(ENC)}) \quad (5)$$

$$K_{part} = A_2(\text{RAND}, \text{SQN}, \text{Alg-ID(ENC)}) \quad (6)$$

Note that the examples (5) and (6) are only possible when the USIM and the AuC derives the partial key since, for security reasons, SQN and AK are typically only available in these network components.

In step 2, the second key $K_2$ is retrieved from the storage 24 and the processor 30 applies a key generation algorithm $A_3$ to the generated partial key $K_{part}$ and the stored second key $K_2$ to generate an encryption key $K_{enc}$.

The key generation algorithms $A_2$ and $A_3$ could comprise key derivation functions (KDF) standardized by 3GPP 33.220.

In step 3, the encrypter 33 of the terminal 3 uses the derived encryption key $K_{enc}$ to encrypt data D that should be transmitted to the server 2. The terminal 3 then forms an application message by including the data D encrypted under $K_{enc}$, $E_{Kenc}(D)$, and, in step 4, the terminal 3 transmits the application message, via the transmitter 34, to the MME.

In a preferred embodiment, the terminal 3 transmits the application message by initiating the attach procedure by the transmission of an 'Attach Request' message to the MME containing the IMSI of terminal 3 and the application message.

In step 5, the processor 51 of the MME generates the partial key $K_{part}$ by applying the key generation algorithm $A_2$ to $K_1$ and Alg-ID(ENC). In one embodiment, the processor 51 may generate the partial key upon receipt in the MME of the application message, e.g. encapsulated in the 'Attach Request' message, from the terminal 3 via the receiving interface 52. In an alternative embodiment, the processor 51 may generate the partial key $K_{part}$ even before receiving the application message from the terminal 3 and store it for future use.

Note that, since the MME does not have access to the SQN and AK but only has access to SQN⊕AK, if SQN or AK were used for the derivation of the partial key, as in the above examples (5) and (6), the HSS/AuC needs to be involved when the MME derives the partial key.

In step 6, using the transmitting interface 54, the MME forwards the application message to the server 2 as well as the partial key $K_{part}$ and, optionally, an identification of the terminal 3 transmitting the application message, M2M_ID. In other embodiments, the MME may provide the partial key to the server 2 separately from the application message, e.g. upon receipt of a request from the server 2 to provide the partial key. In any case, the partial key $K_{part}$ is transferred unencrypted from the MME to the server 2, while the data D is still encrypted by the encryption key $K_{enc}$.

It should be appreciated that the attach request from the terminal 3 may or may not be followed by the actual attach to the network. In principle, such a follow up is not required, since the application message was encapsulated in the attach request and passed on to the server 2.

However, in order to allow further data exchange between the terminal 3 and the network, the attach request may be accepted by the network. In that case, additional steps not illustrated in FIG. 4 may be performed in response to the attach request. These additional steps would include a new AKA and setting up a PDP context. These steps could e.g. be performed after step 4 of FIG. 4.

In step 7, at the server 2, the second key $K_2$ is retrieved from the storage 45 and, by applying the key generation algorithm $A_3$ to the received partial key $K_{part}$ and the retrieved second key $K_2$, the processor 40 generates the encryption key $K_{enc}$. In step 8, the server 2 uses the derived encryption key $K_{enc}$ to decrypt data D transmitted by the terminal 3.

Possibly, the MME only sends the partial key $K_{part}$ to the server 2 if the server 2 transmits a request to the MME for receiving the partial key (not specifically shown in FIG. 4). Such a request could include a verifier identifying the server 2 and the IMSI of the terminal 3 which was received by the server 2 as a part of the application message. The MME could then verify whether the request is authorized using the verifier and, only upon successful verification, transmit the partial key to the server 2 over the transmitting interface 54.

Figure 5:
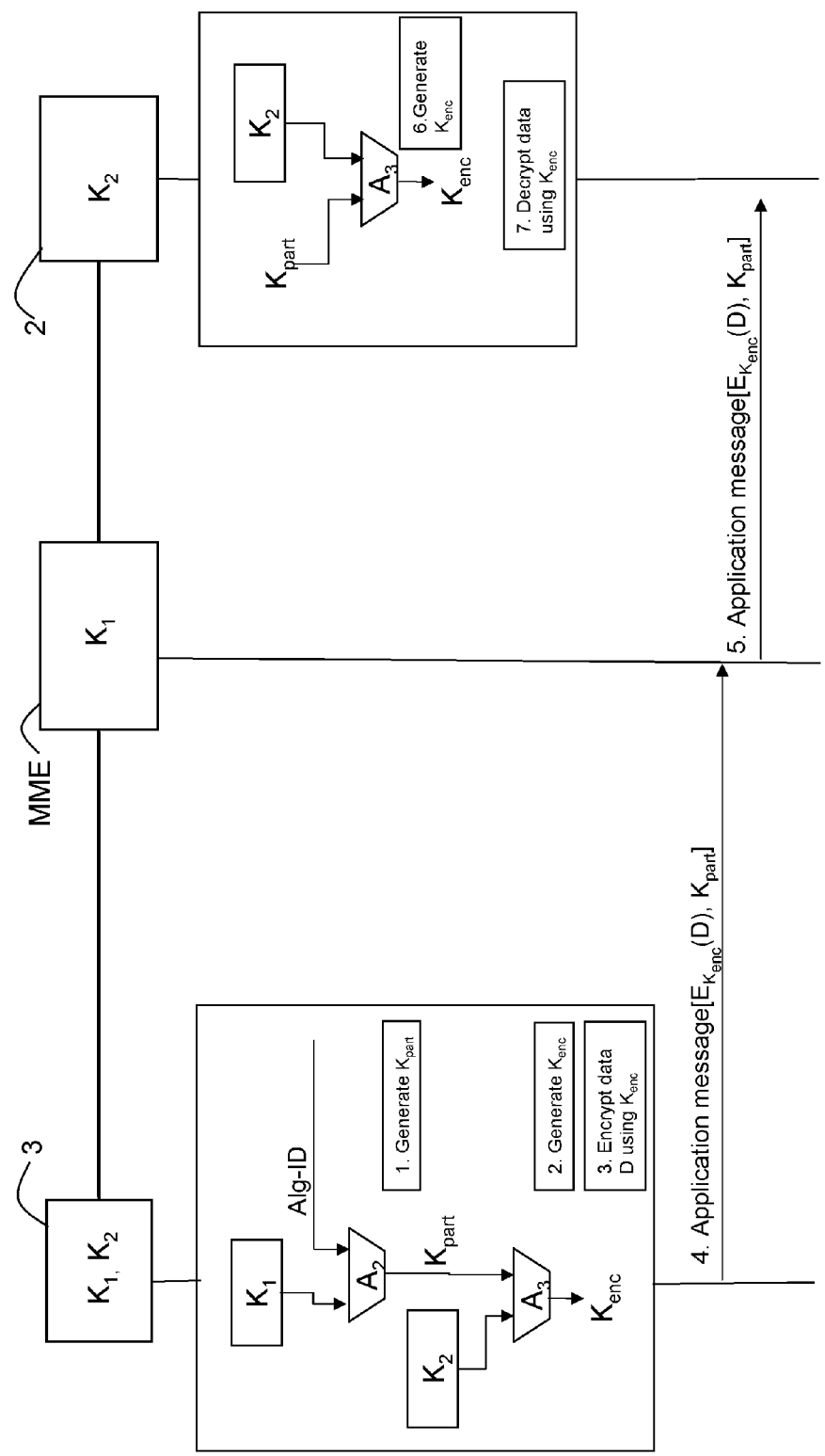

In FIG. 5, an alternative operation is illustrated. FIG. 5 differs from FIG. 4 in that the terminal 3 provides the partial key $K_{part}$ to the server 2 itself, thus eliminating the involvement of the MME for deriving and transmitting this key. Steps 1-3 illustrated in FIG. 5 are analogous to steps 1-3 illustrated in FIG. 4 and, therefore, their discussion is not repeated here.

FIG. 5 differs from FIG. 4 in that the terminal 3 forms an application message by including the partial key $K_{part}$ in the application message, along with the data encrypted under $K_{enc}$, $E_{Kenc}$ (data). This may be done by e.g. concatenating the partial key with the encrypted data.

Steps 1-3 of FIG. 5 are analogous to steps 1-3 of FIG. 4 and, therefore, the detailed discussion associated with these steps is not repeated here. In step 4, the terminal 3 transmits the application message, now also including the partial key $K_{part}$, via the transmitter 34, to the MME.

The MME receives the application message AM via the receiving interface 52 and, in step 6, using the transmitting interface 54, the MME forwards the application message to the server 2. Optionally, the MME could also transmit an identification of the terminal 3 transmitting the application message, M2M_ID, to the server 2. However, for all of the embodiments described herein, such identification could also be included within the application message formed in the terminal 3.

In step 6, the partial key $K_{part}$ is extracted from the application message received over the receiving interface 43, the second key $K_2$ is retrieved from the storage 45 and, by applying the key generation algorithm $A_3$ to the extracted partial key $K_{part}$ and the retrieved second key $K_2$, the processor 40 generates the encryption key $K_{enc}$. In step 7, the server 2 uses the derived encryption key $K_{enc}$ to decrypt data U transmitted by the terminal 3. Steps 6 and 7 of FIG. 5 are analogous to steps 7 and 8, respectively, of FIG. 4 and, therefore, the detailed discussion associated with these steps is not repeated here.

Figure 6:
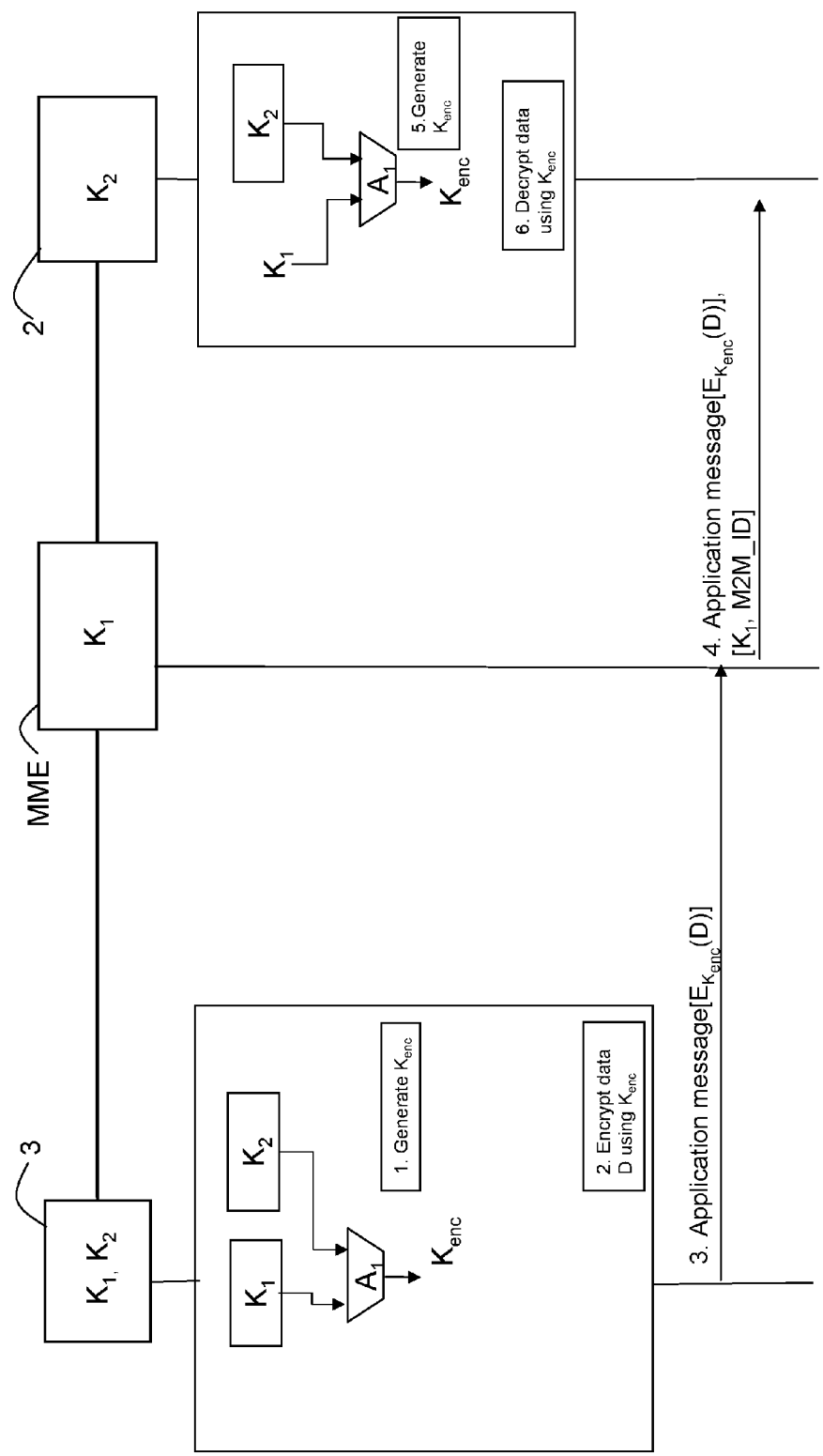

In FIG. 6, another alternative operation is illustrated. FIG. 6 differs from FIG. 4 in that the processor 30 of the terminal 3 does not derive a partial key $K_{part}$, but, instead, derives the encryption key $K_{enc}$ directly by applying encryption algorithm $A_1$ to at least the first key $K_1$ and the second key $K_2$.

Some exemplary ways for deriving the encryption key $K_{enc}$ include the following:

$$K_{enc} = A_1(RAND, K_{M2M}, Alg\text{-}ID(ENC)) \quad (7)$$

$$K_{enc} = A_1(SQN \oplus AK, K_{M2M}, Alg\text{-}ID(ENC)) \quad (8)$$

$$K_{enc} = A_1(RAND, SQN \oplus AK, K_{M2M}, Alg\text{-}ID(ENC)) \quad (9)$$

Similar to the algorithms $A_2$ and $A_3$, the key generation algorithm $A_1$ could comprise key derivation function (KDF) standardized by 3GPP 33.220.

In step 2, the encrypter 33 of the terminal 3 uses the derived encryption key $K_{enc}$ to encrypt data D that should be transmitted to the server 2. The terminal 3 then forms an application message by including the data D encrypted under $K_{enc}$, $E_{Kenc}$ (D), and, in step 3, the terminal 3 transmits the application message, via the transmitter 34, to the MME.

Similar to the description in FIG. 4, in a preferred embodiment, the terminal 3 transmits the application message by initiating the attach procedure by the transmission of an 'Attach Request' message to the MME containing the IMSI of terminal 3 and the application message. The detailed description associated with encapsulating the application message in the 'Attach Request' of FIG. 4 is applicable here, and therefore, is not repeated.

In step 4, using the transmitting interface 54, the MME forwards the application message to the server 2 as well as the first key $K_1$ and, optionally, an identification of the terminal 3 transmitting the application message, M2M_ID. In other embodiments, the MME may provide the first key to the server 2 separately from the application message, e.g. upon receipt of a request from the server 2 to provide the first key. In any case, the first key $K_1$ is transferred unencrypted from the MME to the server 2, while the data D is still encrypted by encryption key $K_{enc}$.

In step 5, at the server 2, the second key $K_2$ is retrieved from the storage 45 and, by applying the key generation algorithm $A_1$ to the received first key $K_1$ and the retrieved second key $K_2$, the processor 40 generates the encryption key $K_{enc}$. In step 6, the server 2 uses the derived encryption key $K_{enc}$ to decrypt data D transmitted by the terminal 3.

Similar to FIG. 4, optionally, the MME only sends the partial key $K_1$ to the server 2 if the server 2 transmits a request to the MME for receiving the first key (not specifically shown in FIG. 4). Such a request could include a verifier identifying the server 2 and the IMSI of the terminal 3 which was received by the server 2 as a part of the application message. The MME could then verify whether the request is authorized using the verifier and, only upon successful verification, transmit the first key to the server 2 over the transmitting interface 54.

Alternatively, in the embodiment illustrated in FIG. 6, the terminal 3 could have included the first key in the application message to the server 2. Since the manner in which the first key could be transmitted by the terminal 3 to the server 2 and how the server 2 would then obtain the encryption key is analogous to how the terminal 3 was configured to transmit the partial key in the application message to the server, described in FIG. 5, in the interests of brevity, these discussions are not repeated here.

It should be appreciated that in the above embodiments, authentication and encryption can be used separately. Authentication is not required to be used every time the terminal 3 needs to send data. In some embodiments, every time the network performs a new AKA, new cryptographic session keys $K_{enc}$ and $K_{int}$ for securing the data between terminal 3 and server 2 may be generated. However, in other embodiments, there may be no need to generate an encryption key $K_{enc}$ every time data is exchanged between terminal 3 and the application server 2. The key $K_{enc}$ can be re-used as often as the terminal 3 or server 2 desires. Both the terminal 3 and the server 2 can request for a new cryptographic session key to be agreed on (e.g. when the key is thought to be compromised or when a set amount of time has elapsed). The network node may then assist the terminal 3 and the server 2 in establishing a new cryptographic session key as described above.

For clarity reasons only the relevant steps of the security procedures are depicted in FIGS. 4-6. Other procedures like the Identity Request, the IMEI check, the Location Update and the Insert Subscriber Data procedures are not included.

Furthermore, the embodiments shown in FIGS. 4-6 can be expanded by adding integrity to the application messages that are sent by the terminal. To that end, data integrity key $K_{int}$ may be derived and handled in a manner analogous to the encryption key $K_{enc}$. Persons skilled in the art that the discussions for the encryption key $K_{enc}$ are analogous to the discussions with respect to the integrity key $K_{int}$, and therefore, are not repeated here. Embodiments are also possible where both an encryption key and an integrity key are generated. In such embodiments, different algorithms and/or different first and/or second keys could be used to derive the encryption key and the integrity key, but the main inventive ideas of the present disclosure are still analogous for both types of keys.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

The invention claimed is:

1. A method for deriving a cryptographic key in a terminal, the method comprising:
   deriving the cryptographic key using a first key and a second key, wherein the first key is received by the terminal from a network node in a network or derived by the terminal based on a parameter received from the network node,
   wherein the cryptographic key is applicable by the terminal for at least one of encrypting at least a part of data included in an application message for an application server transmitted via the network node over the network or authenticating the part of data included in the application message,
   wherein the terminal and the network both have access to the first key,
   wherein the terminal and the application server both have access to the second key,
   wherein the network does not have access to the second key, and
   wherein the second key is a static key which is shared between the terminal and the application server prior to initial communication between the terminal and the application server.

2. The method according to claim 1, wherein deriving the cryptographic key using the first key and the second key comprises: deriving a partial key using the first key and a parameter associated with a communication session between the terminal and the network; and deriving the cryptographic key using the partial key and the second key.

3. The method according to claim 2, wherein the cryptographic key comprises an encryption key for encrypting the part of data included in the application message, and wherein the method further comprises: encrypting the part of data using the encryption key; and transmitting the application message comprising the encrypted part of data to the application server over the network, wherein the application message transmitted to the application server over the network further includes the partial key.

4. The method according to claim 1, wherein the cryptographic key comprises an encryption key for encrypting the part of data included in the application message, and wherein the method further comprises: encrypting the part of data using the encryption key; and transmitting the application message comprising the encrypted part of data to the application server over the network.

5. The method according to claim 4, wherein the application message transmitted to the application server over the network further includes the first key.

6. The method of claim 1, wherein the network comprises all networks over which the application message is transmitted between the terminal and the application server.

7. A method for deriving a cryptographic key in an application server, the method comprising:
   obtaining a first key or a derivative of the first key;
   retrieving a second key from a storage in the application server; and
   deriving the cryptographic key using the obtained first key or the obtained derivative of the first key and the second key, wherein the cryptographic key is applicable by the application server for at least one of decrypting at least a part of data included in an application message for the application server transmitted from a terminal over a network or authenticating the part of data included in the application message, wherein the terminal and the network both have access to the first key, wherein the terminal and the application server both have access to the second key, wherein the network does not have access to the second key, and wherein the second key is a static key which is shared between the terminal and the application server prior to initial communication between the terminal and the application server.

8. The method according to claim 7, wherein the derivative of the first key comprises a partial key derived using the first key and a parameter associated with a communication session between the terminal and the network.

9. The method according to claim 7, wherein obtaining the first key or the derivative of the first key comprises: at least one of: (i) receiving the first key or the derivative of the first key from the network, or (ii) receiving the application message including the first key or the derivative of the first key, and extracting the first key or the derivative of the first key from the received application message.

10. The method according to claim 7, wherein (i) the second key comprises a static key or (ii) the first key comprises at least one of (a) a unique cryptographic key or a parameter associated with a communication session between the terminal and the network, (b) one or more parameters based on which the unique cryptographic key or the parameter associated with a communication session may be generated, or (c) a random number (RAND).

11. The method according to claim 10, wherein the unique cryptographic key or the parameter associated with a communication session between the terminal and the network comprises a session key, and wherein the one or more parameters comprises one or more parameters based on which the session key may be generated.

12. The method of claim 7, wherein the network comprises all networks over which the application message is transmitted between the terminal and the application server.

13. A terminal for deriving a cryptographic key, the terminal comprising:
   a processor configured for deriving the cryptographic key using a first key and a second key, wherein the first key is received by the terminal from a network node in a network or derived by the terminal based on a parameter received from the network node; and
   a storage storing the second key,
   wherein the cryptographic key is applicable by the terminal for at least one of encrypting at least a part of data included in an application message for an application server transmitted via the network node over the network or authenticating the part of data included in the application message, wherein the terminal and the network both have access to the first key, wherein the terminal and the application server both have access to the second key, wherein the network does not have access to the second key, and wherein the second key is a static key which is shared between the application server and the terminal prior to initial communication between the terminal and the application server.

14. The terminal according to claim 13, wherein deriving the cryptographic key using the first key and the second key comprises: deriving a partial key using the first key and a parameter associated with a communication session between the terminal and the network; and deriving the cryptographic key using the partial key and the second key.

15. The terminal of claim 13, wherein the network comprises all networks over which the application message is transmitted between the terminal and the application server.

16. An application server for deriving a cryptographic key, the server comprising:
 a means for obtaining a first key or a derivative of the first key;
 a means for storing a second key; and
 a processor configured for deriving the cryptographic key using the obtained first key or the derivative of the first key and the second key, wherein the cryptographic key is applicable by the application server for at least one of decrypting at least a part of data included in an application message for the application server transmitted from a terminal over a network or authenticating the part of data included in the application message, wherein the terminal and the network both have access to a first key, wherein the terminal and the application server both have access to the second key, wherein the network does not have access to the second key, and wherein the second key is a static key which is shared between the terminal and the application server prior to initial communication between the terminal and the application server.

17. The application server according to claim 16, wherein obtaining the first key or the derivative of the first key comprises: at least one of: (i) receiving the first key or the derivative of the first key from the network, or (ii) receiving the application message including the first key or the derivative of the first key, and extracting the first key or the derivative of the first key from the received application message.

18. The application server of claim 16, wherein the network comprises all networks over which the application message is transmitted between the terminal and the application server.

19. One or more non-transitory computer-readable storage media including instructions which, when executed by one or more processors, cause the one or more processors to perform operations comprising:
 deriving a cryptographic key using a first key and a second key, wherein the first key is received from a network node in a network or derived based on a parameter received from the network node, wherein the cryptographic key is applicable by a terminal for at least one of encrypting at least a part of data included in an application message for an application server transmitted via the network node over the network or authenticating the part of data included in the application message, wherein the terminal and the network both have access to the first key, wherein the terminal and the application server both have access to the second key, wherein the network does not have access to the second key, and wherein the second key is a static key which is shared between the terminal and the application server prior to initial communication between the terminal and the application server.

20. One or more non-transitory computer-readable storage media including instructions which, when executed by one or more processors, cause the one or more processors to perform operations comprising:
 obtaining a first key or a derivative of the first key;
 retrieving a second key from a storage on an application server; and
 deriving a cryptographic key using the obtained first key or the obtained derivative of the first key and the second key, wherein the cryptographic key is applicable by the application server for at least one of decrypting at least a part of data included in an application message for the application server transmitted from a terminal over a network or authenticating the part of data included in the application message, wherein the terminal and the network both have access to the first key, wherein the terminal and the application server both have access to the second key, wherein the network does not have access to the second key and the cryptographic key, and wherein the second key is a static key which is shared between the terminal and the application server prior to initial communication between the terminal and the application server.

* * * * *